United States Patent
Miller

[19]

[11] Patent Number: 6,164,329
[45] Date of Patent: Dec. 26, 2000

[54] GENERALLY T-SHAPED VALVE AND VALVE ASSEMBLY

[75] Inventor: Eric R. Miller, Phoenix, Ariz.

[73] Assignee: Scientific Monitoring Inc., Tempe, Ariz.

[21] Appl. No.: 09/247,486

[22] Filed: Feb. 10, 1999

[51] Int. Cl.[7] .................................................. F16K 11/074
[52] U.S. Cl. ......................... 137/601; 251/228; 251/231
[58] Field of Search ................................. 137/601, 527.8; 251/228, 231

[56] References Cited

U.S. PATENT DOCUMENTS

| | | | |
|---|---|---|---|
| 341,827 | 5/1886 | Benham | 137/601 |
| 381,055 | 4/1888 | Creelman | 251/228 |
| 1,550,668 | 8/1925 | Block | 251/231 |
| 2,277,295 | 3/1942 | Brown | 137/527.8 |
| 2,355,683 | 8/1944 | Sharp | 137/527.8 |
| 2,589,176 | 3/1952 | Wheatley | 137/527.8 |
| 2,649,775 | 8/1953 | Weldon | 137/527.8 |
| 3,147,768 | 9/1964 | Kennedy | 137/601 |
| 3,783,893 | 1/1974 | Davison | 137/527.8 |
| 4,755,095 | 7/1988 | Mailliet et al. | 251/228 |
| 5,485,868 | 1/1996 | Jaw et al. | 137/601 |

*Primary Examiner*—Stephen M. Hepperle
*Attorney, Agent, or Firm*—The Halvorson Law Firm

[57] ABSTRACT

Valve assembly 10 and generally T-shaped fast acting high-output valve 12 suitable to control flow of fluid through base opening 42, wherein valve 12 comprises stem 14 having pivoting end 16 and arm end 18. Two arms 20 are coupled to arm end 18 of stem 14 to form a general T-shape. Arms 20 each have a seating surface 22, a non-seating surface 24, an outer perimeter 26, and an inner perimeter 28. At least one pivoting component 30 is coupled to pivoting end 16, and a force receiving surface 32 is located at least near pivoting end 16 for allowing valve 12 to receive a force thereat and causing an opposite motion at arm end 18. Valve assembly 10 includes valve assembly housing 48, base 38 with at least one valve seat 40 and at least one base opening 42, collector diffuser apparatus 60, and fluid injector 68 with injector opening 70. At least one generally T-shaped valve 12 is pivotably coupled to base 38. Actuator rod 50 and force distributing plate 58 distributes force so that valve 12 is able to pivotably close on valve seat 40 covering base opening 42 and pivotably open from the valve seat 40 exposing base opening 42. Spring component 52 causes valve 12 to be pivotably spring-bias closed on valve seat 40.

14 Claims, 6 Drawing Sheets

6,164,329

GENERALLY T-SHAPED VALVE AND VALVE ASSEMBLY

FIELD OF INVENTION

The present invention relates to a fast acting high output valve and valve assembly, and, in particular, to a generally T-shaped valve or an improved fast acting high output valve assembly with a generally T-shaped valve or valves.

BACKGROUND OF INVENTION AND BRIEF DESCRIPTION OF THE PRIOR ART

Valves are used to regulate or control fluid flow through an opening. Fluid flow control or regulation is typically achieved by the use of a common valve, such as a flap, lid, or plug which may be closed or clamped to restrict fluid flow or may be opened or released to permit fluid flow. Another common type of valve is a gate valve that opens and closes by rotating pivotally around a hinge. The gate valve is opened by placing the gate in a position parallel to the fluid movement to permit fluid flow. Fluid flow is restricted or prohibited when the gate is positioned perpendicular to the fluid movement.

The problem that exists with common or conventional valves, however, is that they are typically not very fast acting because of the amount of time that it takes to turn or clamp the valve. As a result, a small amount of fluid is permitted to flow past the valve as it is initially opened, and the amount of fluid flow past the valve gradually increases to a maximum level as the valve continues to be opened. The same flow characteristics occur in reverse as fie valve is moved to a closed position.

A need exists in the gas turbine industry for a valve that completely opens and closes very fast and permits a large volume of fluid to flow when open and minimizes residual fluid flow when closed. Air flow disturbances occur in the compressor rotors of a gas turbine engine causing undesirable conditions such as "surge" or "stall" which reduce engine performance and may cause severe mechanical damage to the engine. Such conditions may be catastrophic if they occur in an aircraft turbine engine while the aircraft is in flight. Research has indicated, however, that such flow disruptions in compressor rotors may be delayed by locally affecting the air flow conditions of the critical compressor stage rotor.

The air flow conditions may be locally modified by bleeding air from behind the effected rotor or by injecting air in front of the effected rotor. This modification results in improved performance of the compression system. Successful control of flow disruptions allows improved performance of turbine engines and reduces operating, replacement, and repair costs. An injection valve to inject air in front of a rotor or a bleed valve to extract air behind a rotor, however, must be able to cycle from full close to full open to full close at a very fast speed (approximately 150 Hz), and the valve must be able to pass approximately 1.65 cubic feet of air per second at standard day conditions. Therefore, fast acting high output valves and valve assemblies are desired and have been developed.

U.S. Pat. No. 5,485,868 discloses a fast acting high output valve assembly comprising a number of valves and base openings that are each generally shaped like individual "pie" pieces. The individual pie-piece shaped valves and base openings are generally arranged in a circular geometry. An actuator rod is used to apply a force to the pivoting ends of the pie-piece shaped valves at the center portion of the valve assembly to cause the periphery of the individual pie-piece shaped valves to pivot upwardly to expose the base openings. Each pie-piece shaped valve has a relatively large surface area which generates a relatively large amount of resistance as the valve is subjected to a pressurized fluid. Therefore, the valves require a greater amount of applied force in order to open them. This prior art patent is incorporated by reference herein.

FIG. 9 shows a prior art fast acting high output valve assembly 90 wherein the individual pie-piece shaped valves 92 have relatively large surface areas. Since the valves 92 have relatively large surface areas, the valves 92 are more difficult to open against the resistance generated by a highly pressurized fluid which generally forces the valves 92 into closed positions. Also, the volume of fluid that is able to flow through the valve assembly 90 is somewhat more limited because the individual pie-piece shaped valves 92 and base openings 96 when they are in their open positions provide and are limited to only three fluid flow gap areas A, B, and C (i.e. a single outer radius gap area A and two side gap areas B and C) for fluid to flow therethrough. Furthermore, the sizes of the side gap areas B and C decrease substantially from the opening end 98 towards the pivoting end 102 of the valve 92 thereby the efficiency of the fluid flow through these gap areas B and C decreases towards the pivoting end 102 (i.e. not necessarily the most efficient design for maximizing fluid flow through the gap areas). Therefore, in order to provide better fluid flow efficiency, there is the need and desire to provide a larger number of fluid flow areas and/or larger sized fluid flow areas.

A need exists for a fast acting high output valve assembly that has individual valves with minimal surface area so that they are able to be more easily opened against the resistance of external fluid pressure. It is also needed and desired that the valves and valve assembly have a greater number of fluid flow gap areas and that are also larger in size for allowing a larger volume of fluid to flow therethrough when the valves are placed into their open positions.

Therefore, the present invention discloses and provides an improved fast acting high output valve(s) and valve assembly, and the present invention overcomes the problems, disadvantages, and limitations of the prior art.

SUMMARY OF INVENTION

Set forth is a brief summary of the invention in order to solve the foregoing problems and achieve the foregoing and other objects, benefits, and advantages in accordance with the purposes of the present invention as embodied and broadly described herein.

It is an object of the invention to provide a fast acting high output valve that allows more fluid to flow passed it when the valve is in the open position.

It is a further object of the invention to provide a fast acting high output valve that is more easily opened against the resistance of external fluid pressure.

It is another object of the invention to provide a fast acting high output valve that provides a larger number of fluid flow areas.

It is a further object of the invention to provide a fast acting high output valve that provides larger sized fluid flow areas.

It is an object of the invention to provide a fast acting high output valve assembly that allows more fluid to flow through it when the valve assembly is in the open position.

It is a further object of the invention to provide a fast acting high output valve assembly wherein the valve or valves is/are able to be more easily opened against the resistance external fluid pressure.

It is another object of the invention to provide a fast acting high output valve assembly that provides a larger number of fluid flow areas between the valve(s) and base opening(s).

It is a further object of the invention to provide a fast acting high output valve assembly that provides larger sized fluid flow areas between the valve(s) and base opening(s).

The above objects and advantages of the invention are achieved by a fast acting high output valve that has less or minimal resistance surface area so that the valve is able to be more easily opened against the resistance of external fluid pressure.

The above objects and advantages of the invention are further achieved by a generally T shaped fist acting high output valve suitable to control flow of a fluid through a base opening. The valve comprises a stem having a pivoting end and an arm end. Two arms are coupled to the arm end of the stem. The two arms and the stem are coupled together to generally form a T shape. The two arms each have a seating surface, a non-seating surface, an outer perimeter, and an inner perimeter. At least one pivoting component is coupled to the pivoting end of the stem. A force receiving surface is located at least near the pivoting end of the stem for allowing the valve to receive a force at the pivoting end and to transform the force towards the arm end causing an opposite motion thereat.

The above objects and advantages of the invention are achieved by a fast acting high output valve assembly wherein the valve or valves has/have less or minimal resistance surface area so that the valve or valves is/are able to be more easily opened against the resistance of external fluid pressure.

The above objects and advantages of the invention are further achieved by a valve assembly having an improved fast acting high output valve suitable for controlling flow of a fluid therethrough. The valve assembly comprises a base with at least one valve seat and at least one base opening. At least one T-shaped valve is pivotably coupled to the base. The at least one valve is able to pivotably close on the at least one valve seat covering the at least one base opening and pivotably open from the at least one valve seat exposing the at least one base opening. Each of the at least open valve further comprises a stem with a pivoting end and an arm end and two arms coupled to the arm end of the stem. The two arms and the stem coupled together generally form a T shape. The two arms each have a seating surface, a non-seating surface, an outer perimeter, and an inner perimeter. The at least one valve further comprises at least one pivoting component coupled to the pivoting end of the stem and a force receiving surface located at least near the pivoting end of the stem for allowing the valve to receive a force at the pivoting end and to transform the force towards the arm end causing an opposite motion thereat. The at least one valve seat is at least in a similar geometric shape of the seating surface of the at least one valve.

A valve assembly housing houses the valve assembly components. Each of the at least one valve has a force receiving surface at one end. The valve assembly further comprises an actuator rod coupled to the valve assembly housing and near the force receiving surface so that a force applied by the actuator rod to the force receiving surface at the one end is transformed towards another end of the at least one valve causing an opposite motion thereat. At least one spring component is in contact with each of the at least one valve. The at least one spring component is mounted within the valve assembly housing such that each of the at least one valve is spring-bias to pivotably close on the at least one valve seat and to still allow each of the at least one valve to pivotably open from the at least one valve seat.

The base further comprises a fluid inlet side and a fluid outlet side. The valve assembly further comprises a collector and diff-user apparatus coupled to the fluid outlet side for collecting and diffusing fluid flow from the at least one base opening. The collector and diffuser apparatus further comprises a plate coupled to the base and a recessed channel area in the plate that is able to be generally positioned proximate the at least one base opening. A fluid injector having an injector opening is coupled to the collector and diffuser apparatus.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a (desire to invoke the special provisions of 35 U.S.C. Section 112, paragraph 6 to define the invention. To the contrary, if the provisions of 35 U.S.C. Section 112, paragraph 6, are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION

Figure 1:
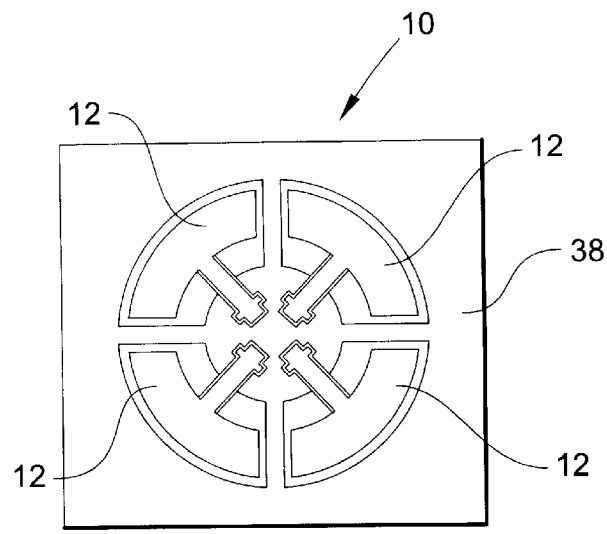
FIG. 1 is a top view of a first embodiment of the present invention valve assembly showing four generally T-shaped valves pivotably coupled to a base.

The present invention is a generally T-shaped fast acting high output valve 12 and a valve assembly 10 having at least one generally T-shaped fast acting high output valve 12 coupled thereto. FIG. 1 is a top view of a first embodiment valve assembly 10 having a base 38 with one or more (i.e. four) individual generally T-shaped fast acting high output valves 12 pivotably coupled thereto. In the specific embodiments shown in the figures, the generally T-shaped valves 12 are shown to be anchor-shaped valves. However, the present invention is not in any way limited to the specific T-shaped or anchor-shaped valves, and any suitable reduced surface area shaped valves may be used with the present invention. The four T-shaped valves 12 are positioned in a generally circular arrangement as shown in FIG. 1.

Figure 2:
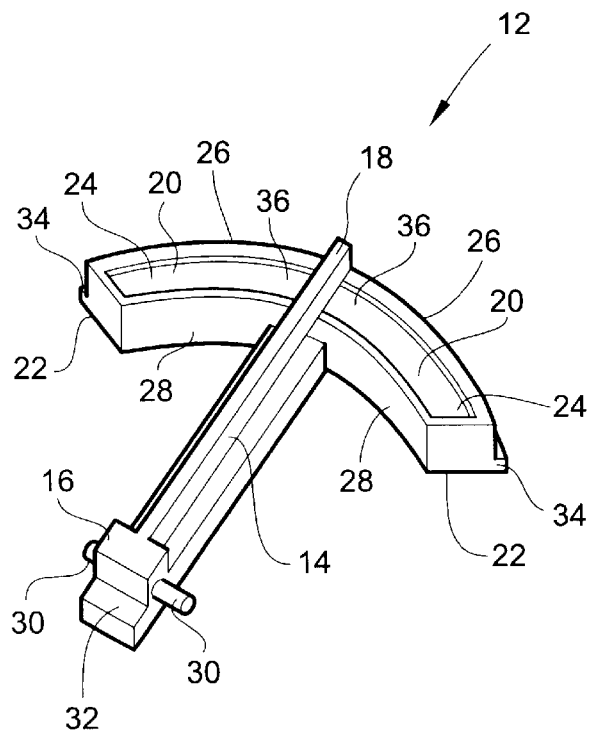
FIG. 2 is a perspective view of the present invention T-shaped valve.

FIG. 2 shows a perspective view of an individual T-shaped valve 12 of the present invention. The valve 12 comprises a stem 14 with a pivoting end 16 and an arm end 18. Two arms 20, which are shown to be curved, are coupled to the arm end 18 of the stem 14 wherein the two arms 20 and the stem 14, coupled together, generally resemble a T-shape. Each of the two arms 20 have a seating surface 22, a non-seating surface 24 with a recessed area 36, an outer perimeter 26, and an inner perimeter 28. At least one pivoting component 30 (i.e. two pivoting components 30 are shown in FIG. 2) is coupled to the pivoting end 16 of the stem 14 so that the valve 12 is able to pivot to open and closed positions. A force receiving surface 32 is located at least near the pivoting end 16 of the stem 14 for allowing the valve 12 to receive a force at the pivoting end 16 and to transform the force towards the arm end 18 causing an opposite motion thereat (i.e. as a force is directed towards or released from the force receiving surface 32, the arm end 18 will move in the opposite direction of that force (See FIG. 10)). Also, the force receiving surface 32 is located on the pivoting end 16 at a position near the pivoting component(s) 30 so that a relatively small movement of the pivoting end 16 causes a relatively large movement of the arm end 18. Such a configuration allows the valve 12 to be operated very quickly when respective force is applied to the force receiving surface 32. The valve 12 shown in FIG. 2 shows that the two arms 20 form a flat and continuous seating surface 22 and a continuous outer perimeter 26 with a ledge 34. However, the present invention is not in any way limited to just these embodiments or configurations, and any suitable embodiment or configuration for providing and using a generally T-shaped fast acting high output valve may be used.

Figure 3:
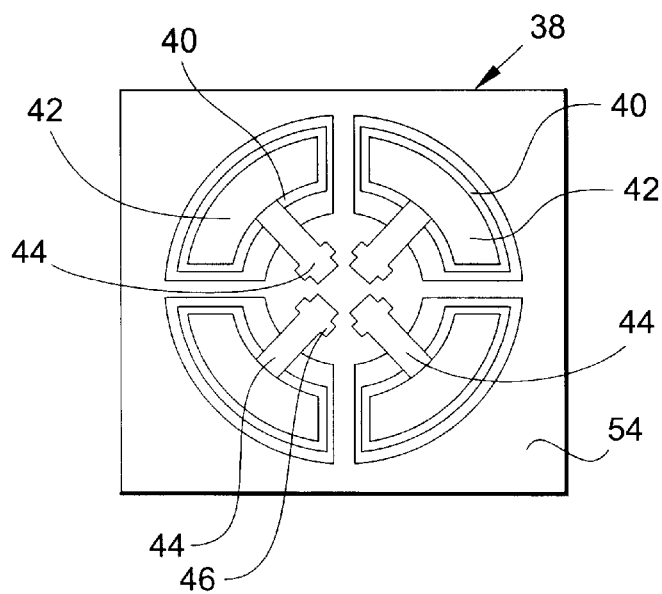
FIG. 3 is a top view of the base of the present invention valve assembly.

FIG. 3 shows the top view of the base 38. The fluid inlet side 54 of the base 38 has four respective base openings 42. The openings 42 allow fluid to pass from the fluid inlet side 54 to the fluid outlet side 56 (i.e. shown in FIG. 7) of the base 38. A valve seat 40 is formed as a continuous seat around each of the base openings 42 on the fluid inlet side 54 of the base 38. Each valve seat 40 is contacted by the seating surface 22 of each respective valve 12 to create a uniform seal and prevent fluid from passing through the base opening 42 when the valve 12 is in the closed position. The valve seat 40 and base opening 42 are configured in the generally same geometric shape as the seating surface 22 of the valve 12. The valve seat 40 or base opening 42 may be made into other suitable shapes so long as they are able to be covered and sealed by the valve 12. The base 38 also has a recessed area 44 to provide access for the stem 14 and the pivoting end 16 of each valve 12 when the valve 12 is resting on the base 38 in the closed position. Notches 46 are provided within the recessed area 44 to receive and hold the pivoting components 30 of each valve 12 to allow pivoting action thereat.

Figure 4:
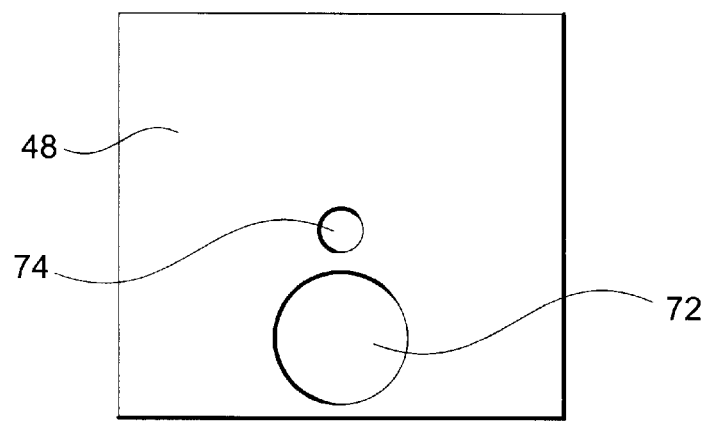
FIG. 4 is a top view of the valve assembly housing of the present invention valve assembly.
Figure 5:
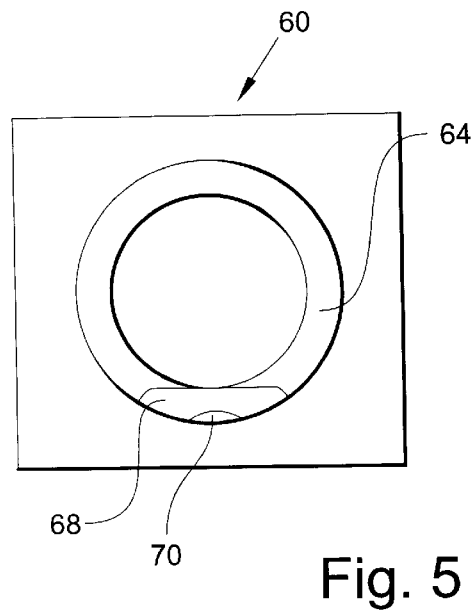
FIG. 5 is a top view of the collector and diffuser and fluid injector of the present invention valve assembly.

Referring to FIG. 4, the valve assembly 10 has a valve assembly housing 48. The valve assembly housing 48 houses valve assembly components and provides a fluid intake opening 72 that directs pressurized fluids towards the valve components. The valve assembly housing 48 also includes an actuator opening 74 that positions and guides an actuator rod 50 or other actuator mechanism that is used to actuate one or more valves 12 located within the housing 48. FIG. 5 shows a collector and diffuser apparatus 60 for the valve assembly 10.

FIG. 5 shows a top view of the collector and diffuser apparatus 60 which includes a recessed channel area 64 that collects and diffuses fluids after they pass through one or more base openings 42 of the valve assembly 10. The recessed channel area 64 shown in FIG. 5 has a circular geometry. However, the present invention is not in any way limited to a circular recessed channel area 64, and any suitable configuration may be used to collect and/or diffuse fluids. The collector and diffuser apparatus 60 also includes a fluid injector 68 having a sloped or angled area that directs fluids away from the recessed channel area 64 and injects the fluids out of an injector opening 70. The fluid injector 68 is formed as part of the recessed channel area 64 as shown in FIG. 5.

Figure 6:
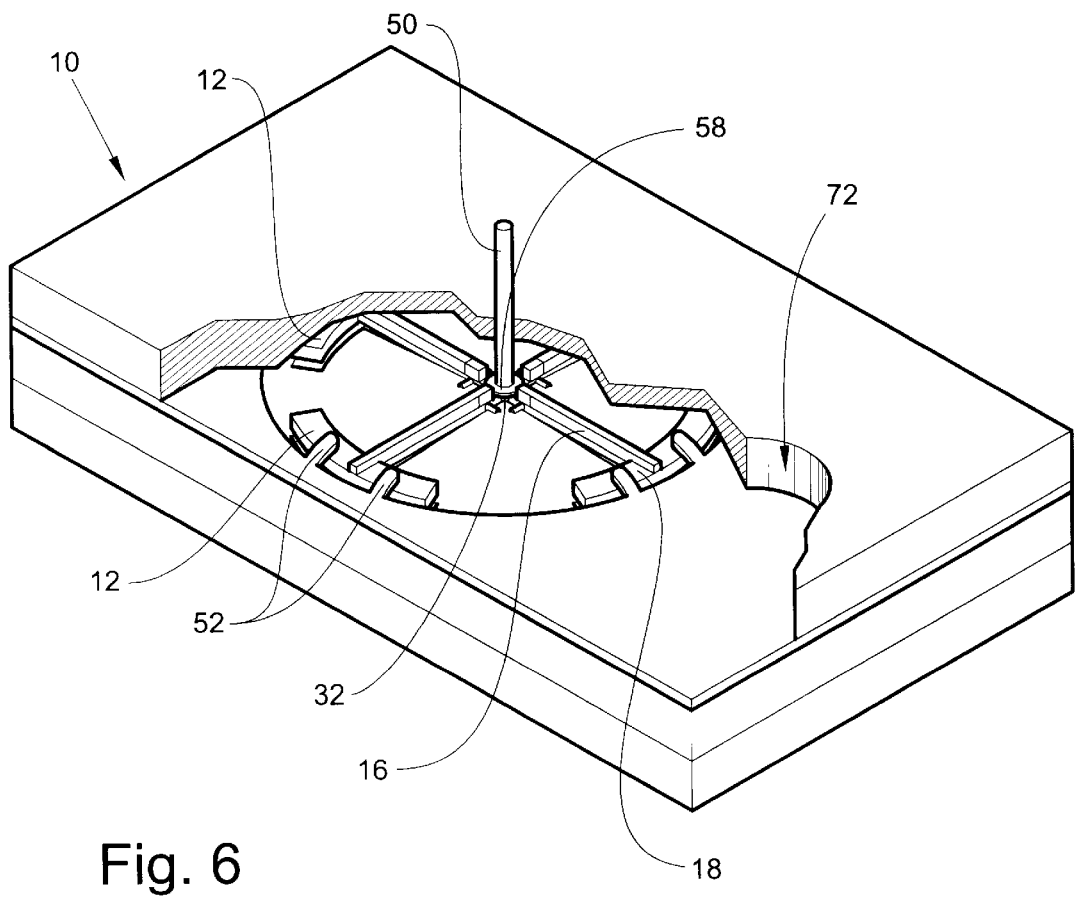
FIG. 6 is a perspective cut-away view of the first embodiment present invention valve assembly.
Figure 7:
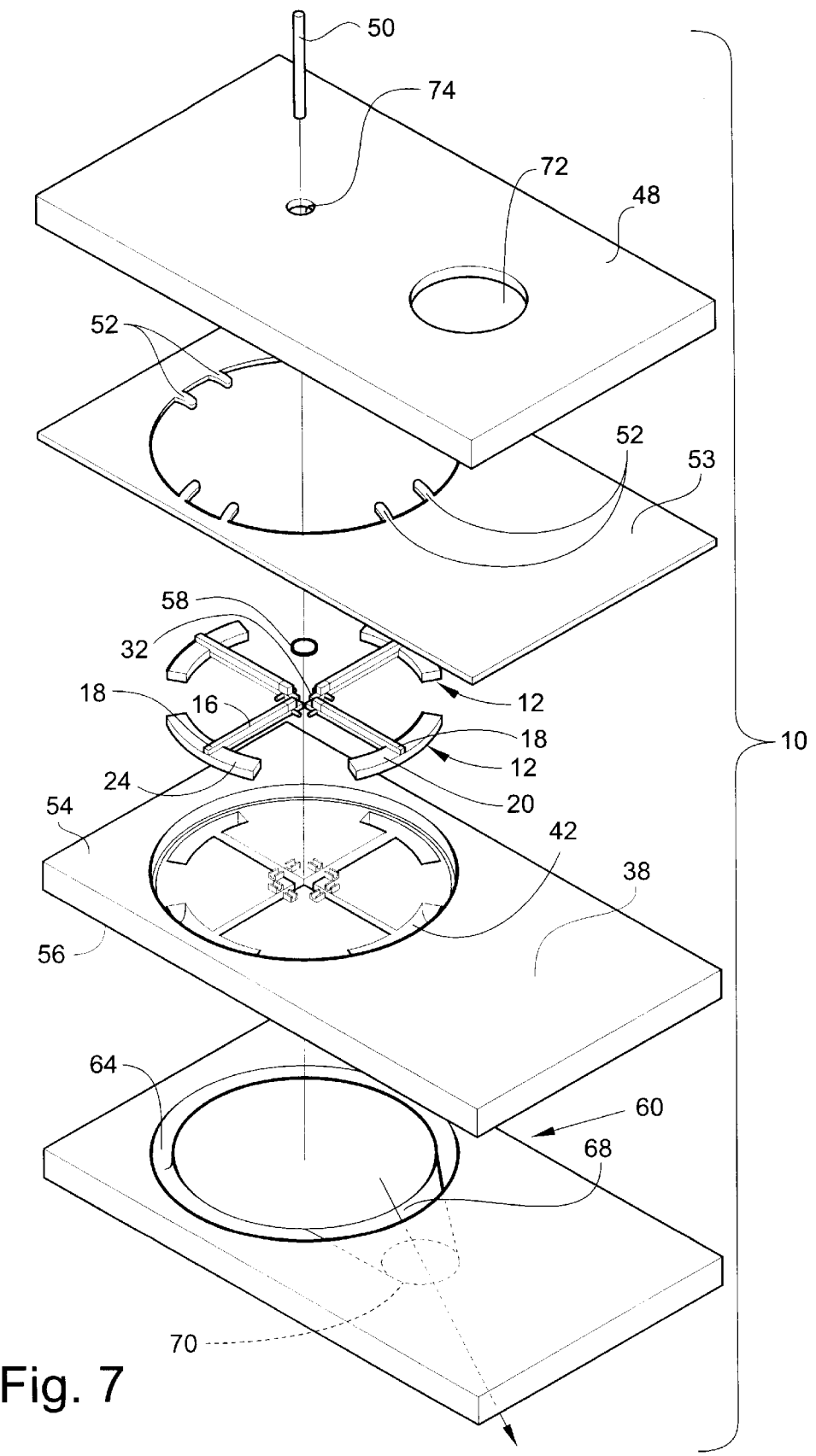
FIG. 7 is an exploded view of the first embodiment present invention valve assembly.

FIGS. 6 and 7 show cut-away and exploded views respectively of a first and preferred embodiment valve assembly 10 having one or more (i.e. four) generally T-shaped valves 12 coupled thereto. Referring to FIG. 6, the generally T-shaped valves 12 are oriented in a circular configuration whereby the pivoting ends 16 are located at a generally central area of the circular configuration and the arm ends 18 extend outwardly towards an outer perimeter of the circular configuration. The force receiving surfaces 32 of the pivoting ends 16 art positioned adjacent to each other around a generally central axis so that the actuator rod 50 is able to actuate all of the valves 12 simultaneously. A force distributing plate 58 is positioned between the actuator rod 50 and the force receiving surfaces 32 of the valves 12. Therefore, a force applied by the actuator rod 50 is equally distributed and applied to each force receiving surface 32 to simultaneously control and pivotably open and close the one or more (i.e. four) valves 12. Also shown in FIG. 6, spring components 52 are coupled to the valve assembly 10 to spring bias the valves 12 in pivotably closed positions. Such spring biasing components 52 help to ensure that the seating surface 22 of each valve 12 is properly aligned with and securely contact with its corresponding valve seat 40 so that each of the valves 12 remains in the closed position.

FIG. 7 shows the relative positioning of the components and parts of the valve assembly 10. The generally T-shaped valves 12 are pivotably coupled to the fluid inlet side 54 of the base 38. The spring components 52 are coupled to a spring plate 53. The spring plate 53 is positioned relative to the base 38 SO that the spring components 52 are positioned over the valves 12. The spring components 52 act to spring bias the valves 12 in closed positions on the valve seats 40. The force distributing plate 58 is positioned over the pivoting ends 16 of the valves 12 so that a portion of the force distributing plate 58 contacts the force receiving surface 32 of each valve 12. The fluid intake opening 72 of the valve assembly housing 48 is positioned relatively close to the fluid inlet side 54 of the base 38. The valve assembly housing 48 supports and guides the actuator rod 50 that extends through the actuator opening 74 to the force distributing plate 58. The collector and diffuser apparatus 60 is coupled to the fluid outlet side 56 of the base 38 so that the recessed channel area 64 is generally near and in alignment with each of the base openings 42.

Figure 8:
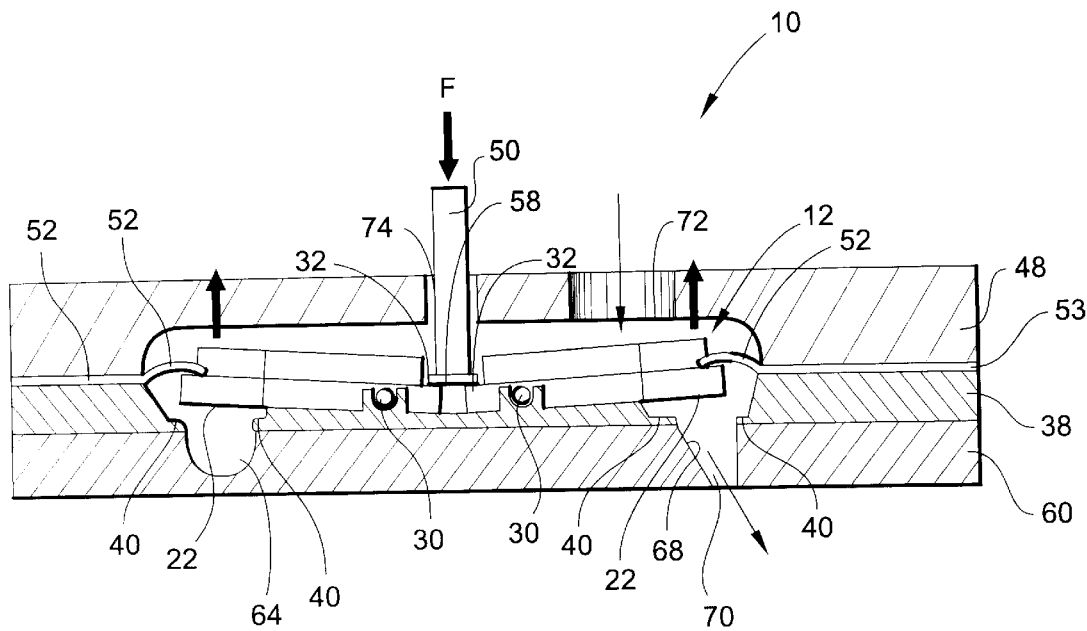
FIG. 8 is a cross-sectional side view of the first embodiment present invention valve assembly showing the valves deflected upwardly from the valve openings and seats.

Referring to FIG. 8, pressurized fluid enters the valve assembly 10 through the fluid intake opening 72 in the assembly housing 48. The fluid is prevented from passing through the base openings 42 until a downward force F is applied by the actuator rod 50 to the valves 12. The force distributing plate 58 directly receives the force F from the actuator rod 50 and distributes the force F evenly to the force receiving surface 32 of each valve 12. Therefore, the seating, surface 22 of each arm 20 is pivoted simultaneously away from its corresponding valve seal 40 thereby creating fluid flow gap areas to allow fluid to pass though the base opening 42. The fluid is collected in the recessed channel area 64 of the collector and diffuser apparatus 60 and exits the valve assembly 10 through the fluid injector 68 and injector opening 70. When the force F is removed or applied in an opposite direction, the valves 12 each return to a spring biased closed position.

Figure 9:
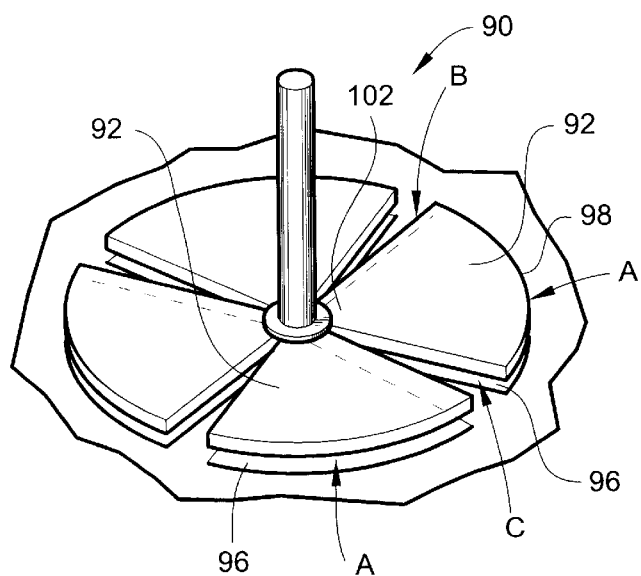
FIG. 9 is a partial perspective view of a prior art fast acting high output valve assembly showing the fluid flow gap areas formed around the pie-piece shaped valves when the pie-piece shaped valves are in the open positions.
Figure 10:
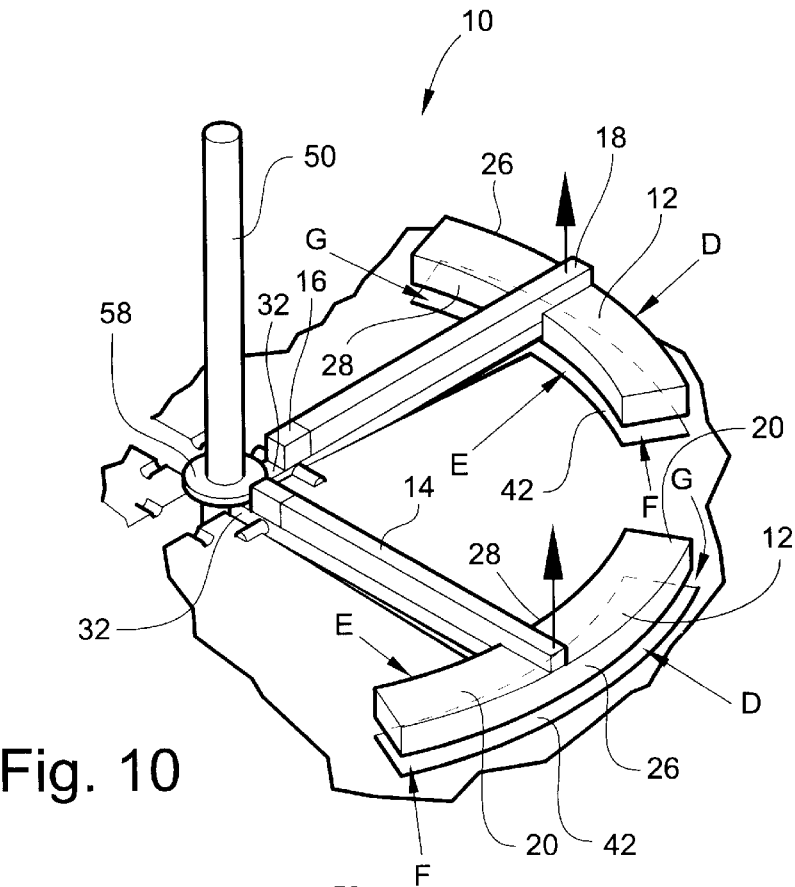
FIG. 10 is a partial perspective view of the first embodiment valve assembly showing the fluid flow gap areas formed around the generally T-shaped valves when the T-shaped valves are in the open positions.

FIG. 10 shows the present invention generally T-shaped valve 12 in an open position. In contrast to the prior art pie-piece shaped valve 92 shown in FIG. 9, the present invention generally T-shaped valve 12 has a slender stem 14 and outwardly extending arms 20 wherein the valve 12 has a smaller overall surface area thereby reducing resistance and the amount of force required to open the valve 12 against forces of a highly pressurized fluid. Also, each generally T-shaped valve 12 creates four (4) fluid flow gap areas D, E, F, and G when the valve 12 is opened or released from the base opening 42. In contrast, the prior art pie-piece shaped valve 92 only provides three (3) fluid flow gap areas A, B, and C. The present invention valve 12 respectively provides gap areas D and E at the outer perimeter 26 and inner perimeter 28 of each arm 20, and gap areas F and G also exist on each side of the two arms 20. Therefore, the present invention generally T-shaped valve 12 is more efficient to operate because it has less resistant surface area, and a greater volume of fluid is able to pass between the valves 12 and the base openings 42 since more gap areas exist. Furthermore, since the fluid flow gap areas D, E, F, and G exist primarily at the arm end 18 of the valve 12, the gap areas together have a generally larger overall size area thereby allowing an even larger volume of fluid to pass between the valves 12 and the base openings 42. In contrast, the fluid flow gap areas A, B, and C together have a generally smaller overall size area since the design of the pie-piece shaped valve 92 is not as efficient for providing fluid flow in that the sizes of the side gap areas B and C decrease substantially from the opening end 98 towards the pivoting end 102 of the valve 92.

Figure 11:
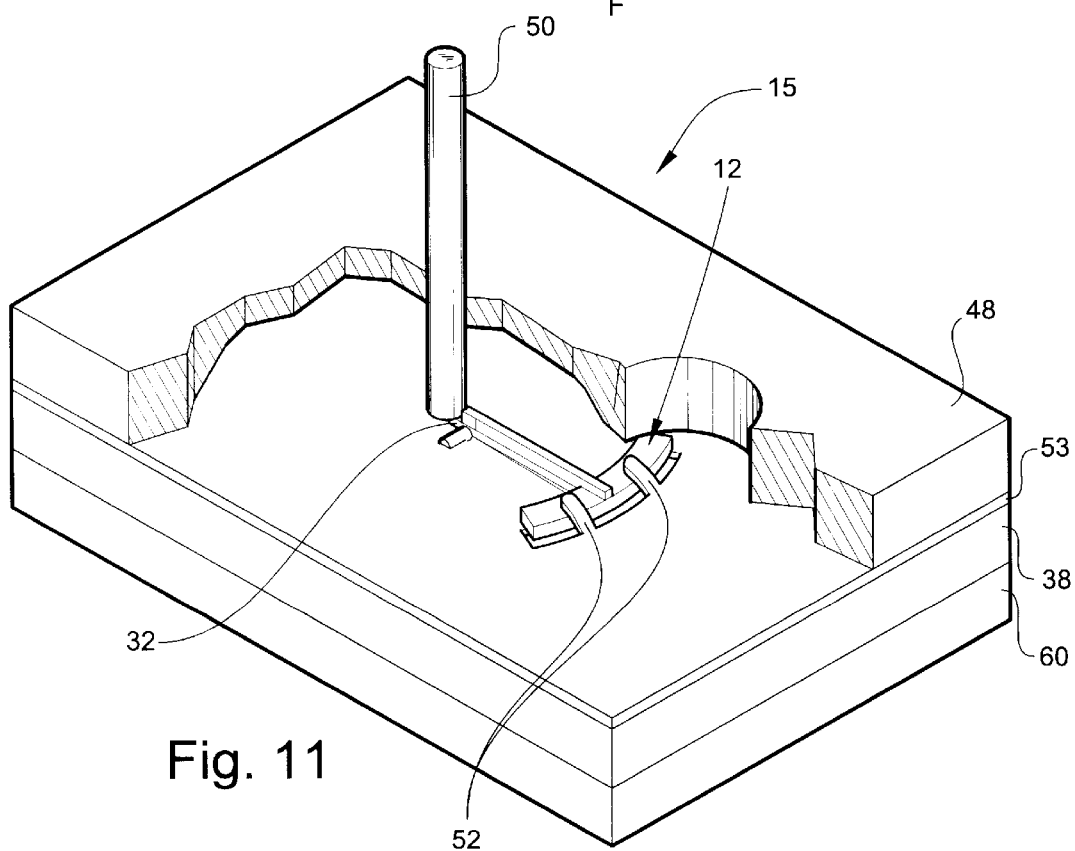
FIG. 11 is a second embodiment valve assembly of the present invention wherein the valve assembly has only one generally T-shaped valve.

FIG. 11 is a second embodiment fast acting high output valve assembly 15 having only one generally T-shaped (i.e. anchor-shaped) valve 12 with a corresponding valve seat 40 and base opening 42. The valve 12 and valve assembly 15 is constructed and operated in the same or similar manner as the valve assembly 10 disclosed and described above.

However, the arms 20 may be made longer, and the force distributing plate 58 may be eliminated. Also, the other respective components of the valve assembly may be adapted or modified for a single generally T-shaped valve 12. Therefore, the present invention may use one or a multiple number of generally T-shaped valve(s) 12.

The preferred embodiment of the invention is described above in the Figures and Detailed Description. Unless specifically noted, it is the intention of the inventor that thee words and phrases in the specification and claims be given the ordinary and accustomed meanings to those of ordinary skill in the applicable art(s). The foregoing description of a preferred embodiment and best mode of the invention known to applicant at the time of filing the application has been presented for the purposes of illustration and description. It is not intended to be exhaustive or to limit the invention to the precise form disclosed, and many modifications and variations are possible in the light of the above teaching. The embodiment was chosen and described in order to best explain the principles of the invention and its practical application and to enable others skilled in the art to best utilize the invention in various embodiments and with various modifications as are suited to the particular use contemplated. Also, the present invention is not in any way limited to the specific embodiments or configurations presented in this specification. Any suitable valve or valve assembly that decreases resistant surface area for opening the valve, that increases overall size or sizes of the fluid flow gap area or areas, and/or that provides a larger number of fluid flow gap areas may be provided and used in conjunction with the present invention.

The present invention provides an injection type valve. However, the present invention is not limited to just an injection type valve, and the above invention may be configured to be a bleed type valve wherein the injector is not needed or may be configured to be any other suitable type valve. Also, the present invention uses a push-type actuator rod assembly, However, the present invention is not limited to just a push-type actuator rod assembly, and the above invention may be configured to use a pull-type actuator rod assembly or other suitable type actuator rod assembly.

What is claimed is:

1. A generally T-shaped fast acting high output valve suitable to control flow of a fluid through a base opening, wherein the valve comprises:

a stem having a pivoting end and an arm end, two arms coupled to the arm end of the stem wherein the two arms and the stem coupled together generally form a generally T shape and wherein the two arms each have a seating surface, a non-seating surface, an outer perimeter, and an inner perimeter, at least one pivoting component coupled to the pivoting end of the stem, and a force receiving surface located at least near the pivoting end of the stem for allowing the valve to receive a force at the pivoting end and to transform the force towards the arm causing an opposite motion thereat.

2. The generally T-shaped fast acting high output valve according to claim 1 wherein each of the two arms further comprises a ledge at the outer perimeter.

3. The generally T-shaped fast acting high output valve according to claim 1 wherein the seating surface of each of the two arms is a flat seating surface.

4. The generally T-shaped fast acting high output valve according to claim 1 wherein the non-seating surface of each of the two arms further comprises a recessed area.

5. The generally T-shaped fast acting high output valve according to claim 1 wherein the seating surfaces of the two arms together form a single continuous seating surface.

6. A valve assembly having a improved fast acting high output valve suitable for controlling flow of a fluid therethrough, wherein the valve assembly comprises:
   a base with at least one valve seat and at least one base opening, and
   at least one generally T-shaped valve pivotably coupled to the base so that the at least one valve is able to pivotably close on the at least one valve seat covering the at least one base opening and pivotably open from the at least one valve seat exposing the at least one base opening, wherein each of the at least one valve further comprises:
      a stem with a pivoting end and an arm end, and
      two arms coupled to the arm end of the stem wherein the two arms and the stem coupled together generally from a generally T-shape, wherein the two arms each have a seating surface, a non-seating surface, an outer perimeter, and an inner perimeter and wherein the at least one valve further comprises at least one pivoting component coupled to the pivoting end of the stem and a fore receiving surface located at least near the pivoting end of the stem for allowing the valve to receive a force at the pivoting end and to transform the force towards the arm end causing an opposite motion thereat.

7. A valve assembly having an improved fast acting high output valve suitable for controlling flow of a fluid therethrough, wherein the valve assembly comprises:
   a base with at least one valve seat and at least one base opening,
   at least one generally T-shaped valve pivotably coupled to the base so that the at least one valve is able to pivotably close on the at least one valve seat covering the at least one base opening and pivotably open from the at least one valve seat exposing the at least one base opening, and
   a valve assembly housing that houses the valve assembly components,
   wherein each of the at least one valve has a force receiving surface at one end, and
   wherein the valve assembly further comprises an actuator rod coupled to the valve assembly housing and near the force receiving surface so that a force applied by the actuator rod to the force receiving surface at the one end is transformed towards another end of the at least one valve causing an opposite motion thereat.

8. A valve assembly having an improved fast acting high output valve suitable for controlling flow of a fluid therethrough, wherein the valve assembly comprises:
   a base with at least one valve seat and at least one base opening
   at least one generally T-shaped valve pivotably coupled to the base so that the at least one valve is able to pivotably close on the at least one valve seat covering the at least one base opening and pivotably open from the at least one valve seat exposing the at least one base opening,
   a valve assembly housing that houses the valve assembly components, and
   at least one spring component in contact with each of the at least one valve wherein the at least one spring component is mounted within the valve assembly housing such that each of the at least one valve is spring-bias to pivotably close on the at least one valve seat and to still allow each of the at least one valve to pivotably open from the at least one valve seat.

9. A valve assembly having an improved fast acting high output valve suitable for controlling flow of a fluid therethrough, wherein the valve assembly comprises:
   a base with at least one valve seat and at least one base opening,
   at least one generally T-shaped valve pivotably coupled to the base so that the at least one valve is able to pivotably close on the at least one valve seat covering the at least one base opening and pivotably open from the at least one valve seat exposing the at least one base opening,
   wherein the base further comprises a fluid inlet side and a fluid outlet side,
   wherein the valve assembly father comprises a collector and diffuser apparatus coupled to the fluid outlet side for collecting and diffusing fluid flow from the at least one base opening, and
   wherein the collector and diffuser apparatus further comprises:
      a plate coupled to the base, and
      a recessed channel area in the plate that is able to be generally positioned proximate the at least one base opening.

10. A valve assembly having an improved fast acting high output valve suitable for controlling flow of a fluid therethrough, wherein the valve assembly comprises:
   a base with at least one valve seat and at least one base opening,
   at least one generally T-shaped valve pivotably coupled to the base so that the at least one valve is able to pivotably close on the at least one valve seat covering the at least one base opening and pivotably open from the at least one valve seat exposing the at least one base opening,
   wherein the base further comprises a fluid inlet side and a fluid outlet side, and
   wherein the valve assembly farther comprises a collector and diffuser apparatus coupled to the fluid outlet side for collecting and diffusing fluid flow from the at least one base opening,
   said valve assembly further comprising:
      a fluid injector located adjacent at least one of the at least one base openings and having an injector opening wherein the fluid injector is coupled to the collector and diffuser apparatus.

11. The valve assembly according to claim 9
   wherein the valve assembly further comprises a fluid injector located adjacent at least one of the at least one base openings and having an injector opening wherein the fluid injector spans only a portion of the recessed channel area and is coupled to the collector and diffuser apparatus and wherein the fluid injector directs the collected and diffused fluid through the injector opening.

12. A valve assembly having an improved fast acting high output valve suitable for controlling flow of a fluid therethrough, wherein the valve assembly comprises:
   a base with at least one valve seat and at least one base opening, and
   at least one generally T-shaped valve pivotably coupled to the base so that the at least one valve is able to pivotably close on the at least one valve seat covering the at least one base opening and pivotably open from the at least one valve seat exposing the at least one base opening, wherein the at least one generally T-shaped valve is four generally T-shaped valves and wherein the at least one valve seat is four valve seats that are at least in similar geometric shapes of the seating surfaces of the four valves and wherein each of the four valves has a pivoting end and an arm end.

13. The valve assembly according to claim 12 wherein the pivoting end of each of the four valves are placed at least adjacent to each other at a generally central location and the arm end of each of the four valves extend outwardly to form a generally circular shape.

14. The valve assembly according to claim 12 further comprising:

a force distributing plate placed over the pivoting end of each of the four valves such that a force applied to the force distributing plate is equally distributed and applied to each of the four valves to simultaneously, pivotably open and close the four valves.

* * * * *